US009642223B2

(12) United States Patent
Salter et al.

(10) Patent No.: US 9,642,223 B2
(45) Date of Patent: May 2, 2017

(54) VEHICLE WHEEL ASSEMBLY ILLUMINATION LAMP

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US); Pietro Buttolo, Dearborn Heights, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/019,155

(22) Filed: Feb. 9, 2016

(65) Prior Publication Data

US 2016/0159274 A1  Jun. 9, 2016

Related U.S. Application Data

(63) Continuation-in-part of application No. 14/087,048, filed on Nov. 22, 2013, now Pat. No. 9,283,819.

(51) Int. Cl.
*H05B 37/02* (2006.01)
*B60C 23/02* (2006.01)
(Continued)

(52) U.S. Cl.
CPC ......... *H05B 37/0272* (2013.01); *B60C 23/02* (2013.01); *B60C 23/0406* (2013.01);
(Continued)

(58) Field of Classification Search
CPC ............ H05B 33/0803; H05B 33/0854; H05B 37/0227; H05B 39/041
(Continued)

(56) References Cited

U.S. PATENT DOCUMENTS

| 4,059,823 A | 11/1977 | Martin et al. |
| 5,465,194 A | 11/1995 | Currie |

(Continued)

FOREIGN PATENT DOCUMENTS

| CN | 104869728 A | 8/2015 |
| CN | 105303642 A | 2/2016 |

(Continued)

OTHER PUBLICATIONS

"Tire Pressure LED Alarm Sytem," www.tirepressureled.com/tire-pressure-led/, 3 pages, copyrighted 2013 by Automotive Upgrade Technology Inc.
(Continued)

*Primary Examiner* — Tuyet Vo
(74) *Attorney, Agent, or Firm* — Jason Rogers; Price Heneveld LLP

(57) ABSTRACT

A vehicle wheel illumination assembly is provided. The assembly includes a light source located on the body of a vehicle near the wheel well and oriented to direct light onto a wheel assembly having a tire. A tire pressure indicator detects tire pressure of the tire. The light source illuminates the wheel assembly with a desired color to indicate a tire pressure status based on the detected tire pressure. A sensor senses a person near the wheel assembly and a controller activates the light source to illuminate the wheel assembly based on the sensed person to enable servicing of the tire.

19 Claims, 9 Drawing Sheets

(51) Int. Cl.
*B60C 23/04* (2006.01)
*B60Q 1/32* (2006.01)
*G01M 17/02* (2006.01)
*H05B 33/08* (2006.01)
*B60Q 1/38* (2006.01)

(52) U.S. Cl.
CPC ........... *B60Q 1/326* (2013.01); *G01M 17/027* (2013.01); *H05B 37/0227* (2013.01); *B60Q 1/38* (2013.01); *B60Q 2400/40* (2013.01); *B60Q 2900/30* (2013.01); *H05B 33/0815* (2013.01)

(58) Field of Classification Search
USPC ...... 315/76–83; 340/539.22, 539.23, 539.26, 340/541, 551, 552
See application file for complete search history.

(56) References Cited

U.S. PATENT DOCUMENTS

| | | | |
|---|---|---|---|
| 5,844,479 A | 12/1998 | Walton | |
| 6,260,988 B1 | 7/2001 | Misawa et al. | |
| 6,294,989 B1 * | 9/2001 | Schofield | B60C 23/00 340/438 |
| 8,097,843 B2 | 1/2012 | Agrawal et al. | |
| 8,103,414 B2 | 1/2012 | Boss et al. | |
| 8,178,852 B2 | 5/2012 | Kingsley et al. | |
| 8,232,533 B2 | 7/2012 | Kingsley et al. | |
| 8,247,761 B1 | 8/2012 | Agrawal et al. | |
| 8,415,642 B2 | 4/2013 | Kingsley et al. | |
| 8,937,454 B2 | 1/2015 | Baarman et al. | |
| 9,194,168 B1 | 11/2015 | Lu et al. | |
| 9,442,888 B2 | 9/2016 | Stanfield et al. | |
| 2006/0208865 A1 | 9/2006 | Quach et al. | |
| 2006/0239018 A1 | 10/2006 | Jardin | |
| 2007/0030136 A1 | 2/2007 | Teshima et al. | |
| 2011/0012062 A1 | 1/2011 | Agrawal et al. | |
| 2012/0020101 A1 | 1/2012 | Pastrick et al. | |
| 2012/0326611 A1 * | 12/2012 | Nanahara | H05B 37/0227 315/151 |
| 2013/0154821 A1 | 6/2013 | Miller et al. | |
| 2015/0138789 A1 | 5/2015 | Singer et al. | |
| 2015/0324708 A1 | 11/2015 | Skipp et al. | |
| 2015/0339928 A1 | 11/2015 | Ramanujam | |
| 2015/0366036 A1 | 12/2015 | Luostarinen | |

FOREIGN PATENT DOCUMENTS

| | | |
|---|---|---|
| EP | 2380758 A1 | 10/2011 |
| JP | 2005231519 A | 9/2005 |
| WO | 2008093266 A1 | 8/2008 |
| WO | 2008145937 A1 | 12/2008 |

OTHER PUBLICATIONS

U.S. Appl. No. 14/825,603, filed Aug. 13, 2015 (15 pages of application, 5 pages of drawings and 3 pages of Official Filing Receipt).

U.S. Appl. No. 14/948,860, filed Nov. 23, 2015 (15 pages of application, 6 pages of drawings and 3 pages of Official Filing Receipt).

* cited by examiner

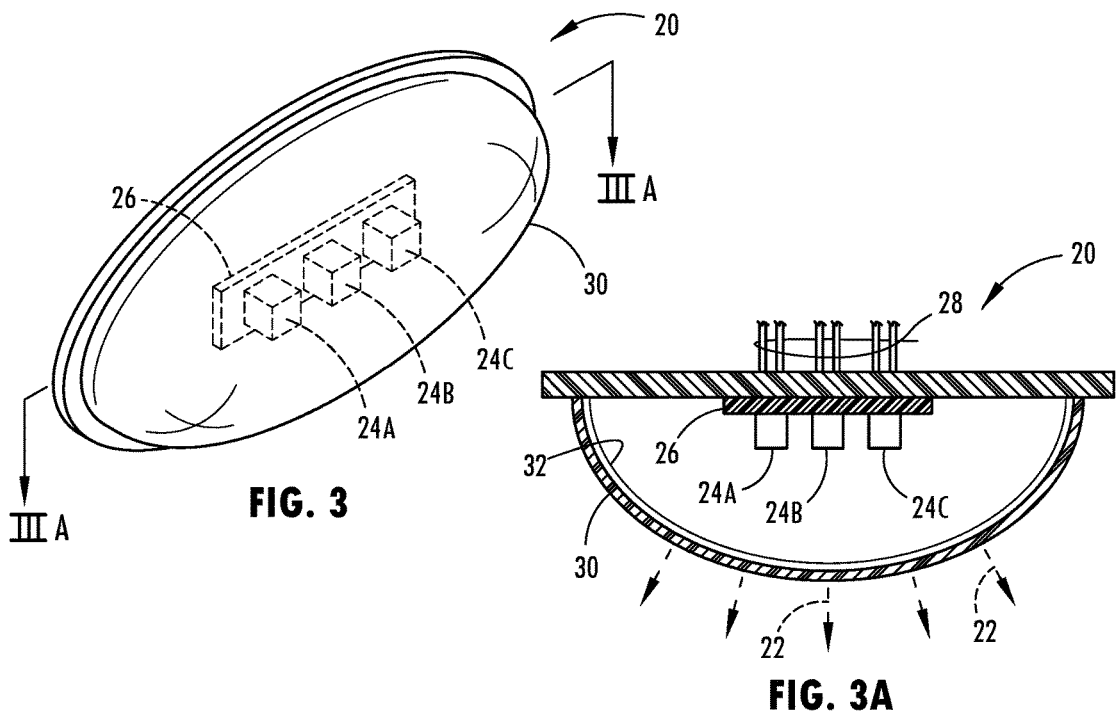
FIG. 3
FIG. 3A
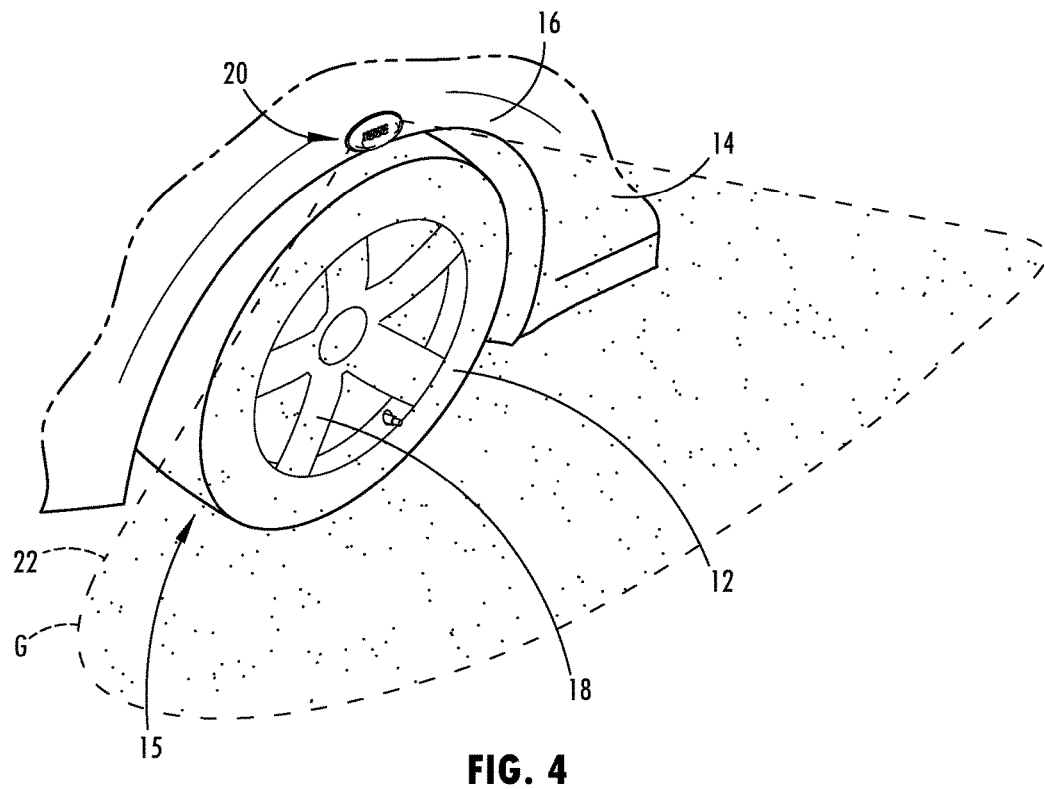
FIG. 4

VEHICLE WHEEL ASSEMBLY ILLUMINATION LAMP

CROSS-REFERENCE TO RELATED APPLICATION

This application is a continuation-in-part of U.S. patent application Ser. No. 14/087,048, filed on Nov. 22, 2013, now U.S. Pat. No. 9,283,819 entitled "VEHICLE WHEEL ASSEMBLY ILLUMINATION LAMP." The aforementioned related application is hereby incorporated by reference.

FIELD OF THE INVENTION

The present invention generally relates to vehicle exterior lighting, and more particularly relates to a body-mounted lamp for illuminating the tire on a vehicle.

BACKGROUND OF THE INVENTION

Automotive wheeled vehicles employ wheels having inflated tires that are designed to operate efficiently within a certain tire air pressure range. Some vehicles are equipped with tire pressure monitors for monitoring the tire air pressure and provide an indicator such as a warning on a display in the instrument cluster when the tire pressure is low while the vehicle is operating. It is desirable to provide for a tire pressure indicator to indicate the status of the tire that is readily discernible by a vehicle operator, such as when the vehicle is not operating. It is further desirable to provide for efficient and effective illumination of the wheel during the servicing of a tire.

SUMMARY OF THE INVENTION

According to one aspect of the present invention, a vehicle wheel illumination assembly is provided. The assembly includes a light source located on a vehicle body and arranged to illuminate a wheel assembly having a tire, and a sensor for sensing a person near the wheel assembly. The assembly also includes a controller for controlling the light source to illuminate the wheel assembly when a person is detected near the wheel assembly to enable servicing of the tire.

According to another aspect of the present invention, a vehicle wheel illumination assembly is provided. The assembly includes a light source located on a body of a vehicle, a tire pressure detector for detecting air inflation pressure of a tire on a wheel assembly of the vehicle, and one or more sensors for sensing a person near the wheel assembly. The assembly also includes a controller controlling the light source to illuminate the wheel assembly with a first color light indicative of a tire air pressure status and further illuminating the wheel assembly with a second color light when the person is detected near the wheel assembly to enable servicing of the tire.

According to a further aspect of the present invention, a method of illuminating a vehicle wheel assembly is provided. The method includes the steps of arranging a light source on a vehicle body to illuminate a wheel assembly comprising a tire, detecting a low tire pressure of the tire, and activating a light source to illuminate light on the wheel assembly to indicate the low tire pressure with a first color light. The method also includes the steps of detecting a person near the wheel assembly and activating the light source to illuminate light at a different second color when the person is detected near the wheel assembly to aid in servicing the tire.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a an enlarged perspective view of the lamp assembly employing three LEDs, according to one embodiment;

FIG. 3A is a cross-sectional view of the lamp assembly taken through line IIIA-IIIA of FIG. 3;

FIG. 4 is an enlarged perspective view of a portion of the vehicle body illustrating one of the wheel wells and lamp assembly for illuminating the wheel assembly for a fully inflated tire;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
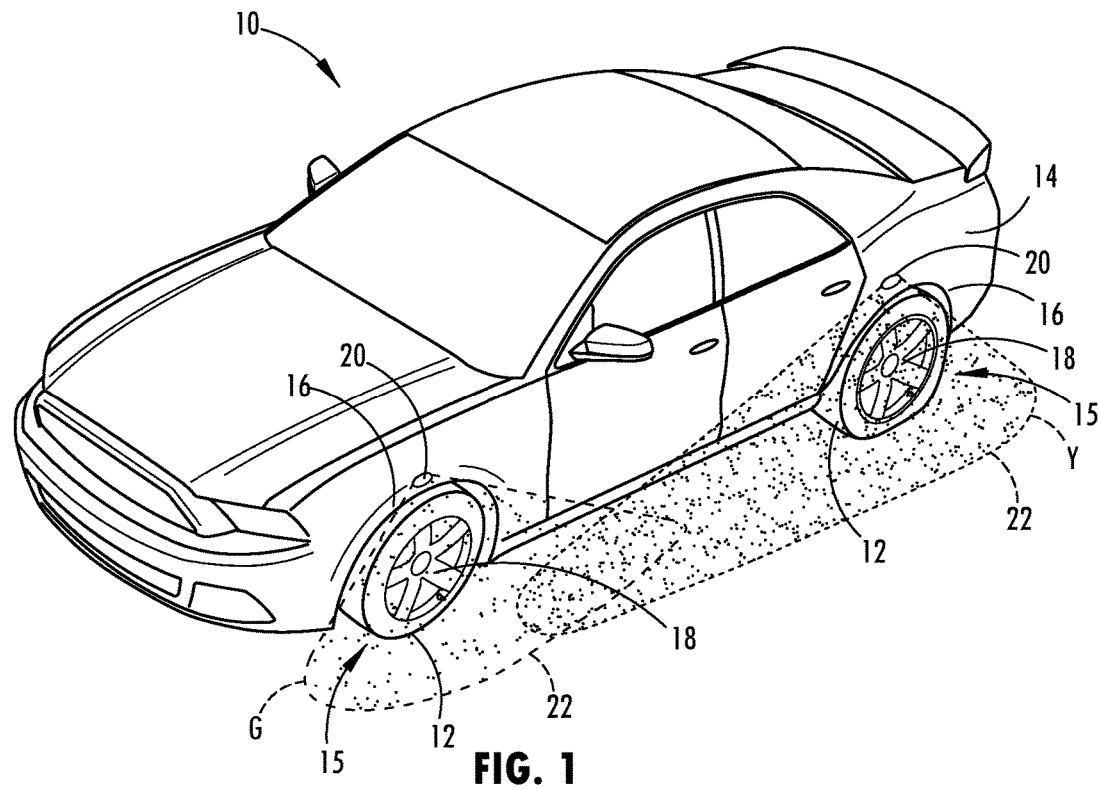
FIG. 1 is a side perspective view of an automotive vehicle having lamp assemblies located near each wheel well for illuminating the corresponding wheel assemblies, according to one embodiment.
Figure 2:
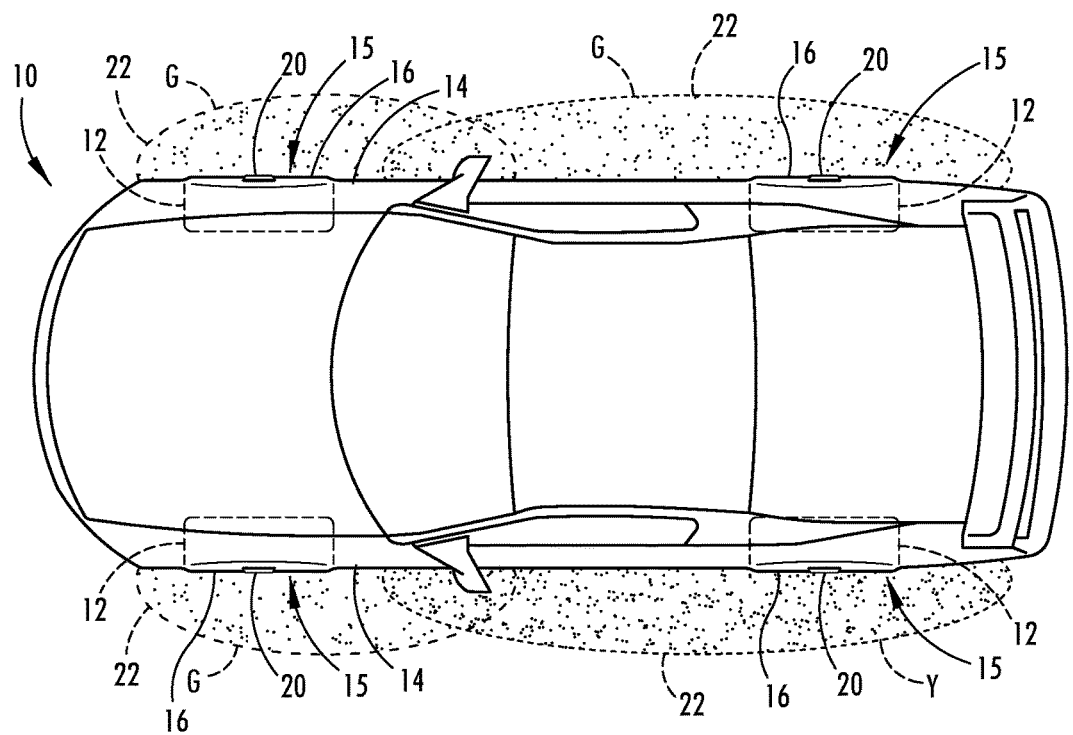
FIG. 2 is a top view of an automotive vehicle having the lamp assemblies shown in FIG. 1.
Figure 9:
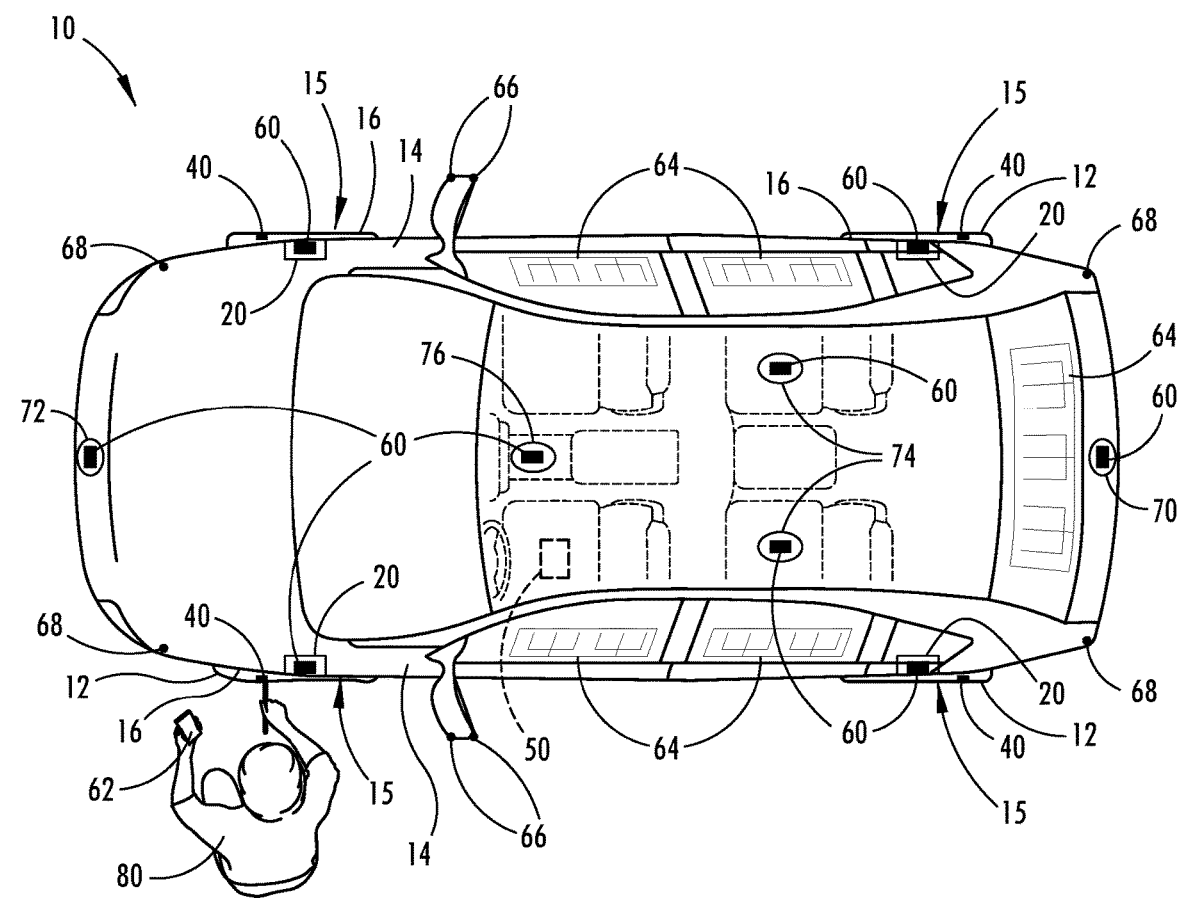
FIG. 9 is a top view of a vehicle having a sensing arrangement using various sensors to detect a person near a wheel assembly and controlling the light source to enable servicing of the tire, according to another embodiment.

For purposes of description herein, the terms "upper," "lower," "right," "left," "rear," "front," "vertical," "horizontal," and derivatives thereof shall relate to the invention as oriented in FIGS. 1, 2 and 9. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, an automotive wheeled vehicle 10 is shown in a form of a passenger car having a body 14 and four wheel assemblies 15 having central wheels 18 and rubber tires 12 assembled thereto. The vehicle 10 may include any wheeled vehicle, such as a car, a truck, or a bus having tires that are inflated with pressurized air and in contact with the roadway. Each tire 12 is assembled to the corresponding wheel 18 and is inflated with air preferably at a desired inflation pressure to provide adequate vehicle performance. Tires are typically inflated with pressurized air to a pressure within a desired range as suggested by the tire manufacturer. When the tire pressure drops below a low tire pressure limit, the tire may be considered a flat tire.

The vehicle 10 is equipped with a vehicle wheel illumination assembly 20 located near each wheel well 16 on the vehicle body 14 to illuminate a corresponding a wheel assembly 15 including the tire 12 to indicate the tire pressure status. In the example shown, four wheel illumination assemblies 20 are provided to illuminate the four wheel assemblies including the four tires 12, respectively. Each wheel illumination assembly 20 includes a light source located near the wheel well 16 of the vehicle body 14. The wheel illumination assembly 20 is shown located on the upper outer edge of the wheel well 16 and arranged to generate light illumination downward and laterally outward so as to illuminate the outer wall of the corresponding tire 12 and the outer surface of the wheel 15 as well as the ground surface extending laterally outward therefrom. The illumination assembly 20 has a predetermined light color indicative of the status of the tire. According to one embodiment, the light source of the illumination assembly 20 illuminates the tire with a first color light to indicate a low tire pressure when the tire pressure is below a low pressure limit and illuminates the tire with a different second color light to indicate sufficient tire pressure when the tire pressure is above the low pressure limit. For example, a low tire pressure status may be indicated with the use of a first yellow color light and a second green color light may be employed to indicate sufficient tire pressure status.

In addition to providing lighting for tire inflation indication, the wheel illumination assembly 20 may further illuminate the tires 12, wheels 18 and nearby ground surface with light when a puddle lamp signal is generated to provide puddle lamp lighting. For example, when an operator (person) approaching the vehicle 10 initiates a door unlock activation via an input on a key fob or other device, the four wheel illumination assemblies 20 may all be activated to provide puddle lamp lighting. The puddle lamp lighting provided by wheel illumination assemblies 20 may be in addition to other lighting provided by puddle lamps otherwise provided on the vehicle 10, such as on the rearview exterior mirror assembly, or may replace such puddle lamp assemblies. Further, the wheel illumination assembly 20 may illuminate one or more tires 12, wheels 18 and ground surface when the vehicle 10 is driven and a turn signal is generated to provide a turn signal indication. As such, the light source of the illumination assembly 20 may flash a red, amber or other color light as a turn signal indication in addition to or in place of other vehicle turn signal indicators.

The wheel illumination assembly 20 is further illustrated in FIGS. 3 and 3A, according to one embodiment. In this embodiment, the wheel illumination assembly 20 includes a plurality of light emitting diodes (LEDs), such as three LEDs 24A-24C, all shown mounted to a circuit board 26. Each of LEDs 24A-24C includes electrical circuitry 28 for receiving electrical power to generate light illumination at a desired wavelength or frequency. In one embodiment, each of LEDs 24A-24C generates a light output at a different wavelength, such as 460 nanometer (nm), 470 nm, and 480 nm, respectively. An outer lens with optics 30 is provided to direct the light generated by the light source downward into a desired light projection field to illuminate the outer walls of the wheel assembly including the tire 12 and wheel 18 and the ground surface extending laterally outward from the corresponding tire 12. In addition, the wheel illumination assembly 20 has an inner lens 32 shown located between the outer lens 30 and the LEDs 24A-24C.

The inner lens 32 may be made of plastic and may include different rylene dye impregnations provided in or on plastic lens 32. A first rylene dye when illuminated with 460 nm wavelength light of the first LED emits a red light at a wavelength of about 520 nm. A second rylene dye when illuminated with the 470 nm wavelength light of the second LED emits green light at a wavelength of above 520 nm. A third rylene dye when illuminated with the 480 nm wavelength light of the third LED emits a blue light at a wavelength of about 480 nm. Each of the first, second and third rylene dyes are selected to react with one of the three LEDs at a specific wavelength to generate a light output at a designated wavelength. The rylene dyes may be selected to react with certain wavelengths of blue light to generate a resulting color mix. The first, second and third rylene dyes may be painted or otherwise applied onto the plastic lens 32 and may be formed stacked one on top of another. Examples of energy conversion and the use of rylene dyes for color mixing are disclosed in one or more of U.S. Pat. Nos. 8,415,642; 8,247,761; 8,232,533; 8,178,852; 8,097,843, U.S. Patent Application Publication No. 2011/0012062; and U.S. Patent Application Publication No. 2015/0138789, the entire disclosures of which are hereby incorporated herein by reference. Use of the rylene dye for color mixing allows for the use of less expensive blue LEDs. It should further be appreciated that if the dye coating is translucent, then the first and second dyes may be utilized without the third dye, such that the resulting blue color output comes from the blue LED transmitted through the translucent plastic lens 32. Red, green, blue (RGB) light is then produced from the three (3) blue LEDs. As is commonly known by mixing red, green and blue light, any color light may be obtained. The red, green and blue light can be mixed in different proportions to generate other color lighting.

This lighting assembly allows for the use of cost-effective and efficient LEDs to achieve a desired light illumination. According to other embodiments, different colored light sources, such as LEDs, may be employed to generate a desired light output. For example, alternative red, green, and blue LED packaging having a red LED, a green LED and a blue LED may be used to generate desired colors of light outputs when used in combination, according to known light color mixing techniques.

Referring to FIG. 4, the vehicle wheel illumination assembly 20 is shown generating a first color light illumination on the outer walls of wheel assembly 15 including a tire 12 and wheel 18 and ground surface shown by lighting field 22. In this example, a green color light is illuminated within field 22 and onto the wheel assembly 15 to indicate that the tire inflation pressure of tire 12 is of a pressure exceeding a low pressure limit. The first light could be a white light, according to another example. As such, an operator of the vehicle 10 when approaching the vehicle is presented with a visual indication that the tire pressure is adequate. The tire pressure indication may be presented when the vehicle 10 is not operating and an operator is approaching the vehicle 10, such as when the operator activates the door unlock input button on a key fob.

Figure 5:
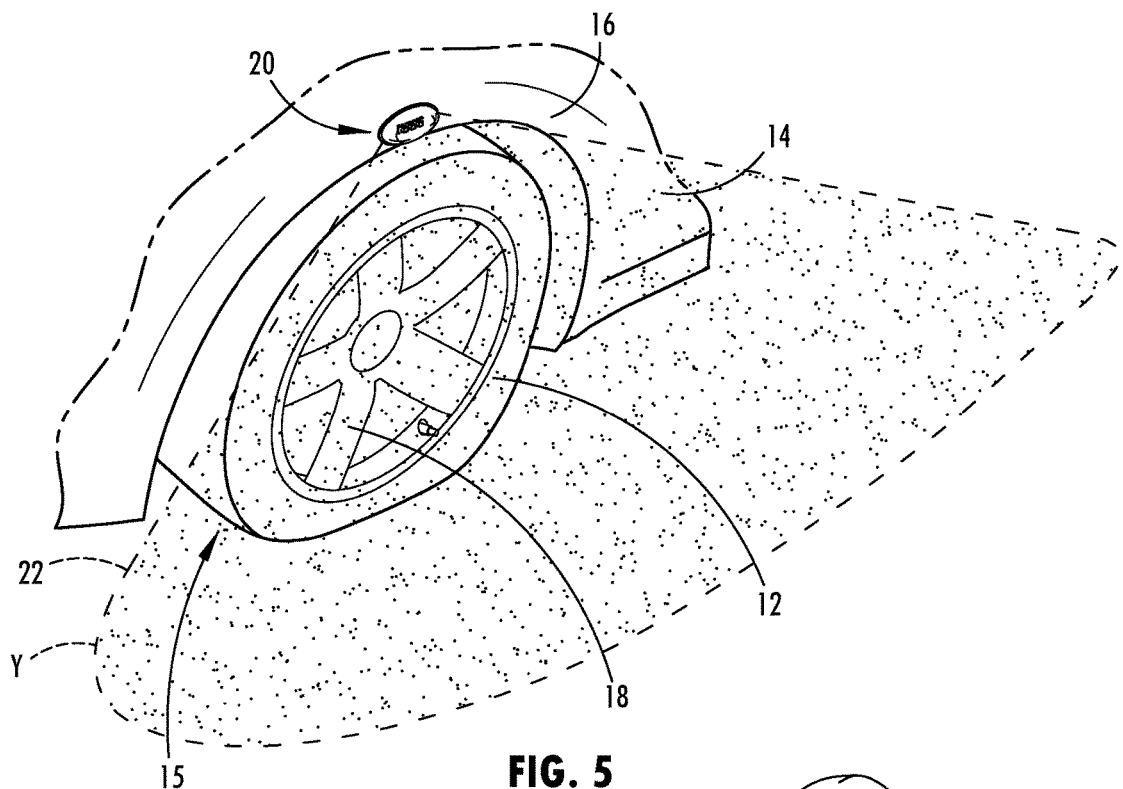
FIG. 5 is an enlarged perspective view of a portion of the vehicle body illustrating one of the wheel wells and lamp assembly for illuminating the wheel assembly for a flat tire indication.

Referring to FIG. 5, the vehicle wheel illumination assembly 20 is shown generating a different second color light illuminated onto the outer walls of the wheel assembly 15 including the tire 12 and surrounding ground surface. In this example, the tire 12 is shown as underinflated having an inflation tire pressure of less than the low pressure limit, also referred to as a flat tire. When the tire pressure is detected as being underinflated, the assembly 20 generates a yellow color light illuminated onto the outer walls of the wheel assembly 15 and its tire 12 and onto the ground surface within lighting field 22 so that an operator of the vehicle 10 approaching the vehicle 10 may readily recognize the flat tire indicator.

Figure 6:
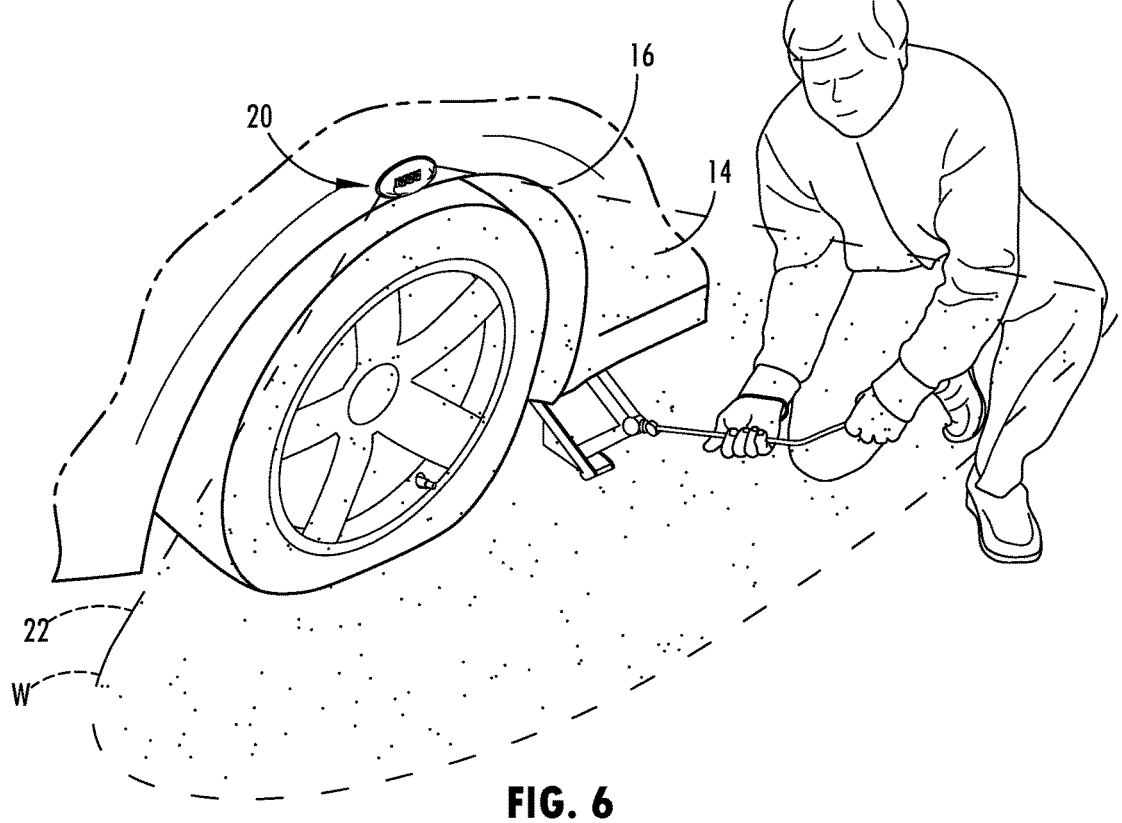
FIG. 6 is an enlarged perspective view of a portion of the vehicle body illustrating one of the wheel wells and lamp assembly for illuminating the wheel assembly for a service light.

Referring to FIG. 6, the vehicle wheel illumination assembly 20 is shown operating as an area light to generate light illumination within a lighting field 22 which also illuminates the wheel assembly 15 including the tire 12 and ground surface. The area light enables an operator to service the vehicle such as inflating or changing the flat tire. The area light may include a third different color light illumination, such as a white light.

It should further be appreciated that the wheel illumination assembly 20 further may be activated to provide puddle lamp lighting when an operator of the vehicle is determined to be approaching the vehicle to enable the operator to enter and exit the vehicle 10. The puddle lamp application may generate a white light or other color light on the wheel assembly 15 and its tires 12 and nearby ground surface. Further, the wheel illumination assembly 20 may generate a desired color lamp to be used as a turn signal indicator when a turn signal is generated while the vehicle is driven. As such, one or more of the wheel illumination assemblies 20 may flash to signal a turn signal as a substitute or in addition to the vehicle turn signals.

Figure 7:
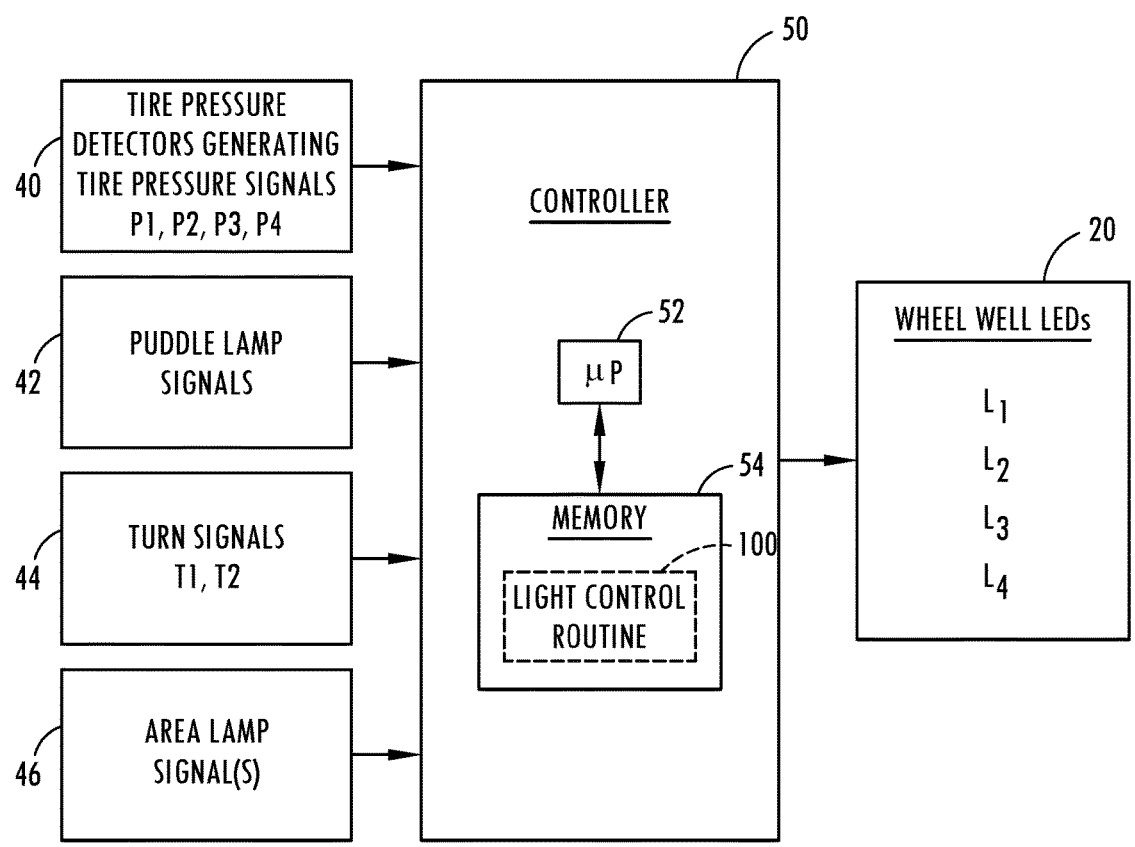
FIG. 7 is a block diagram illustrating the lamp assemblies and controls for providing tire pressure indication, puddle lamp illumination, and turn signal indication, according to one embodiment.

The vehicle wheel illumination assemblies 20 are shown in FIG. 7 controlled by a controller 50 in response to various inputs. The wheel illumination assemblies 20 each include light sources shown as wheel well LEDs L1-L4 located near wheels for lighting the corresponding tire 12 and wheel assemblies 15. The controller 50 is shown including control circuitry in the form of a microprocessor 52 and memory 54. A light control routine 100 is shown stored in memory 54 and executable by the microprocessor 52. The microprocessor 52 or other control circuitry processes the various inputs and the light control routine 100 and generate outputs to control the wheel well LEDs L1-L4 of the vehicle wheel illumination assemblies 20. It should be appreciated that other analog and/or digital circuitry may be employed to process the various inputs and routines to activate the vehicle wheel illumination assemblies 20.

The inputs to controller 50 include tire pressure signals P1-P4 which are generated by respective tire pressure detectors associated with each tire 12. Each wheel assembly has a tire and a tire pressure detector for detecting the air inflation pressure of the tire 12. As such, four tire pressure detectors are employed to detect four tire pressure signals P1-P4. In addition, puddle lamp signals 42 are input to the controller 50 indicative of a desired activation of puddle lamps. Further, two turn signals T1-T2 are input to the controller 50 indicative of the desired turn indication for when the driver indicates the vehicle is to turn to the left or the right. As such, the two left side wheel illumination assemblies flash light to indicate a left turn and the two right side wheel illumination assemblies flash light to indicate a right turn. Further, one or more area lamp signals 46 may be input to the controller 50 indicative of the driver requesting activation of wheel area lamp lighting. The controller 50 processes the various inputs 40-46 pursuant to the light control routine 100 to activate the vehicle wheel illumination assemblies 20 as described herein.

Figure 8:
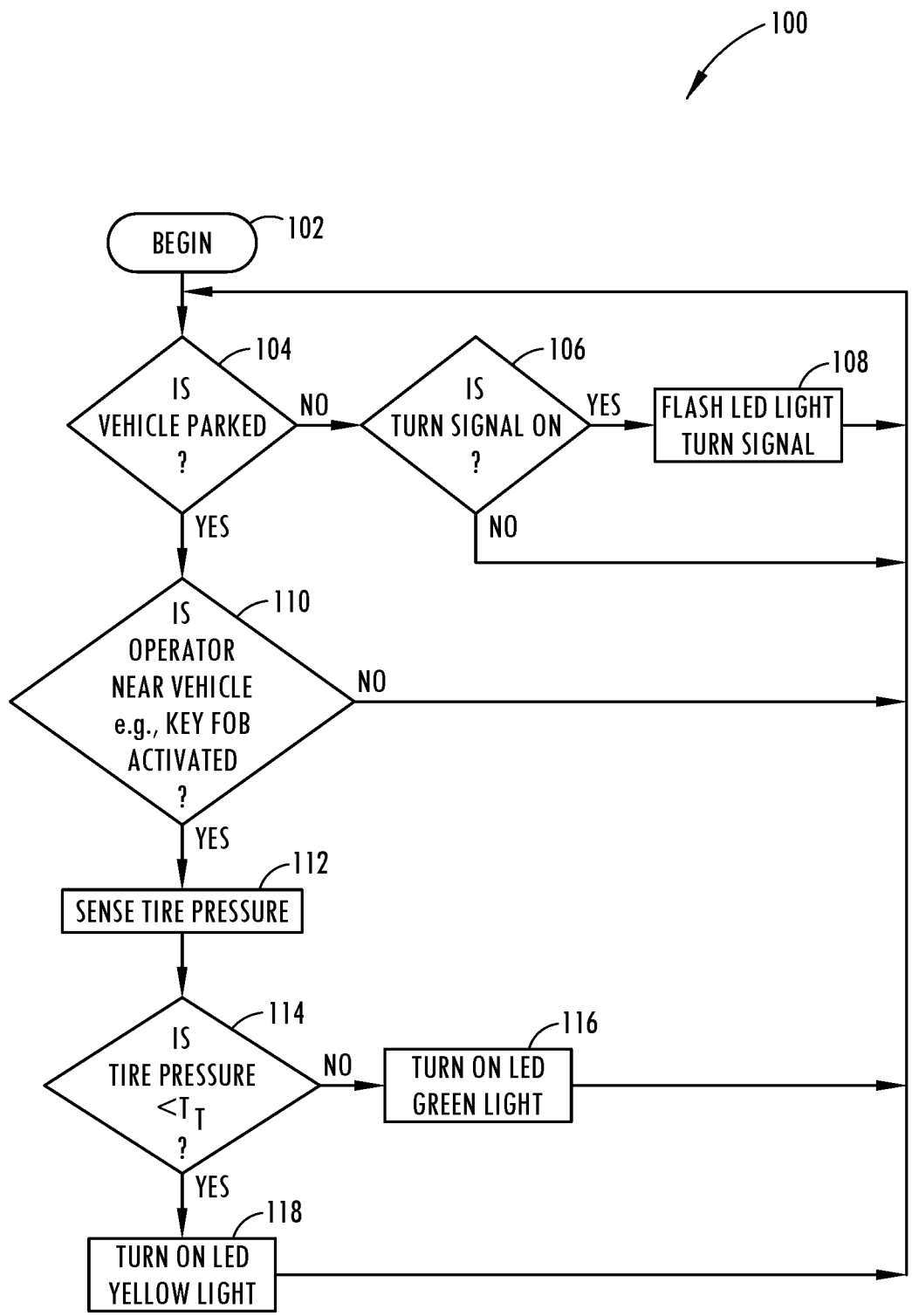
FIG. 8 is a flow diagram illustrating a routine for providing lighted tire pressure indication, puddle lamp illumination, and turn signal indication, according to one embodiment.

Referring to FIG. 8, the light control routine 100 for controlling the vehicle wheel illumination assembly is illustrated, according to one embodiment. Routine 100 begins at step 102 and proceeds to decision step 104 to determine if the vehicle is parked. If the vehicle is not parked, routine 100 will proceed to decision step 106 to determine if a turn signal is on and, if so, will flash the LED light as a turn signal indicator at step 108 to indicate a desired turning direction before returning to step 104. The turn signal indicator may include flashing the light sources associated with the wheel illumination assemblies 20 on the same side of the vehicle as the vehicle is expected to turn. If the turn signal is not on, routine 100 returns to step 104.

If the vehicle is parked as determined at step 104, routine 100 proceeds to decision step 110 to determine if the operator is near the vehicle. This may include detecting activation of the key fob such as a door unlock button which would indicate that the operator is near the vehicle. If the operator is not near the vehicle, routine 100 returns to step 104. If the operator is determined to be near the vehicle, routine 100 proceeds to step 112 to sense tire pressure for each of the tires on the vehicle. Next, at decision step 114, routine 100 determines if the sensed tire pressure is less than a tire pressure threshold $T_T$. If the tire pressure is not less than tire pressure threshold $T_T$, routine 100 proceeds to step 116 to turn on the LED light associated with that tire with a green light indicative of sufficient tire pressure, before returning to step 104. If the sensed tire pressure is less than the tire pressure threshold $T_T$, routine 100 proceeds to step 118 to turn on the LED light associated with that tire with a yellow light indicative of a low tire pressure, prior to returning to step 104.

Accordingly, the vehicle wheel illumination assembly 20 in the above described embodiment advantageously provides for a light indication of the tire pressure by illuminating the wheel assembly 15 including the tire with a light source mounted on the vehicle body to indicate the tire pressure status. This enables the operator of the vehicle to confirm adequate tire inflation pressure or to become aware of a low tire pressure situation while the operator is not within the vehicle cabin such that the operator may take corrective action to inflate the tire or change the tire prior to operating the vehicle. The illumination assembly 20 advantageously provides for the addition of puddle lamp lighting, turn signal indication, and area lighting which advantageously allows for integration of such lighting functions.

Figure 10:
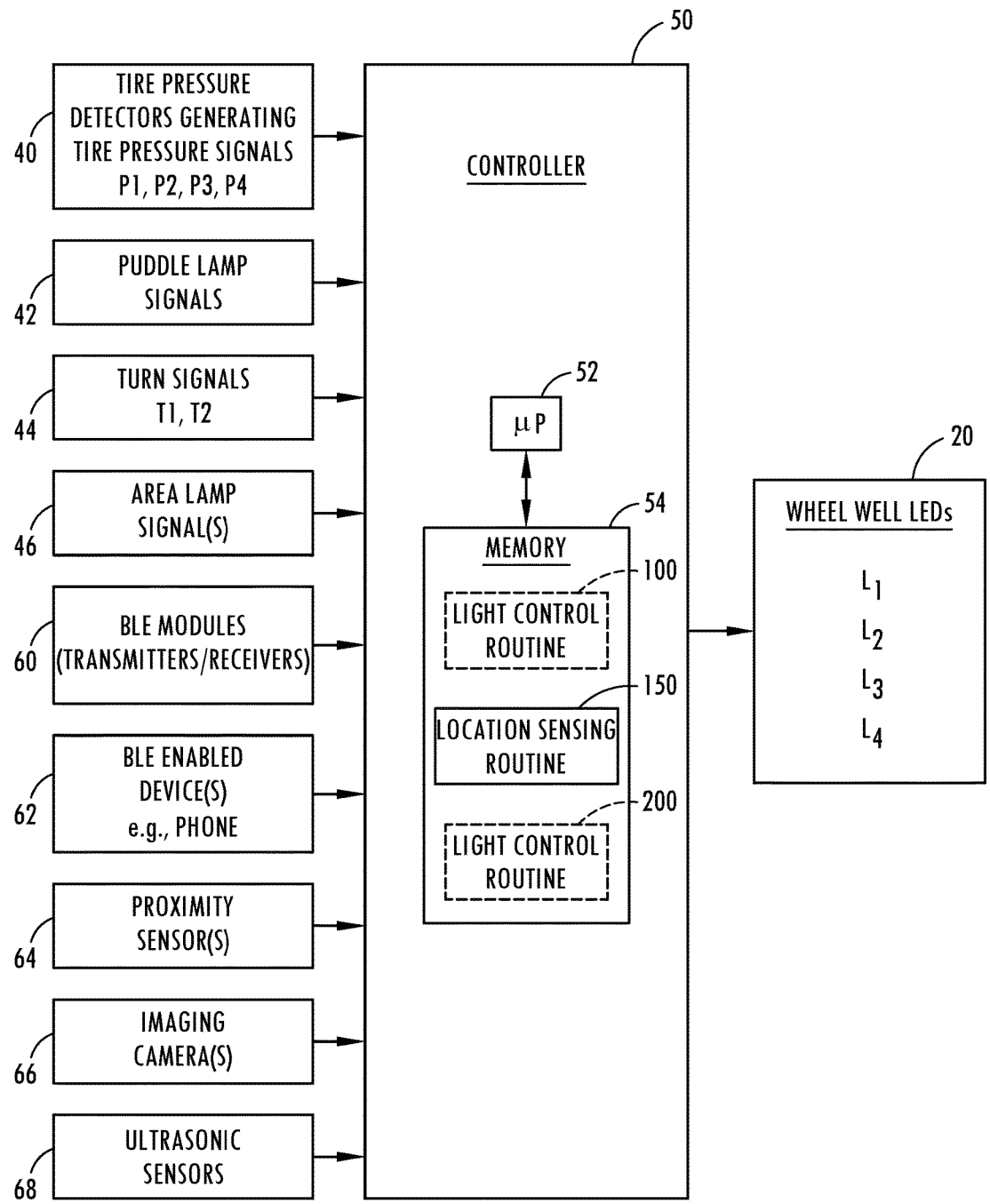
FIG. 10 is a block diagram illustrating the lamp assembly and controls for detecting the person and providing lighting control to assist with servicing the tire.

Referring to FIGS. 9-11, the vehicle wheel illumination assembly 20 is illustrated according to another embodiment. In this embodiment, the vehicle wheel illumination assembly 20 employs the light source located on the wheel well 16 of the vehicle body 14 and arranged to illuminate a wheel assembly 15 of the vehicle 10. The vehicle wheel assembly is configured to indicate tire air pressure status and to further control the lighting to assist a person 80, such as a vehicle operator (i.e., driver), with servicing of the tire 12, such as inflating the tire 12 or replacing the entire wheel assembly 15 and thereby changing the tire. The vehicle wheel illumination assembly 20 includes a sensor arrangement having one or more sensors for sensing a location of a person 80 near one of the wheel assemblies 15. The sensor arrangement includes one or more sensors that may sense a person near the wheel assembly 15 and the assembly presumes that the person 80 is attempting to service the tire 12 or wheel assembly 15. The vehicle wheel illumination assembly 20 further includes a controller for controlling the light source to illuminate the wheel assembly 15 when the person 80 is detected near to the wheel assembly 15 to enable the servicing of the tire 12. The person 80 may be considered near the wheel assembly 15 when the person 80 is within a predetermined distance such as three (3) feet, according to one example. However, the distance may be five (5) feet or less or some greater distance.

As seen in FIG. 9, the vehicle 10 is equipped with one or more sensors for sensing a person near one or more of the wheel assemblies 15 of the vehicle 10. The sensors may include wireless communication transceivers such as Bluetooth Low Energy (BLE) modules 60 which may be associated with various devices onboard the vehicle, according to one embodiment. According to another embodiment, the sensors may include proximity sensors, such as capacitive sensors 60, located at various locations around the vehicle, such as within the window glass or body of the vehicle. According to a further embodiment, the sensors may include one or more imaging cameras 66 located on the vehicle 10. According to yet a further embodiment, the sensors may include ultrasonic sensors 68. It should be appreciated that the sensors may include one or more of the BLE modules 60, proximate sensors 64, imaging cameras 66, and ultrasonic sensors 68 in various combinations. It should further be appreciated that other types of sensors such as radar and other sensing configurations may be employed for sensing a person near one or more of the wheel assemblies 15.

In the embodiment shown in FIG. 9, various BLE modules 60 are shown located within various devices onboard the vehicle 10. The BLE modules 60 may be located in or otherwise associated with an illuminated badge 72 at the rear of the vehicle, an illuminated badge 70 at the front of the vehicle, various wheel lamps 20, map lamps 74, and a body controller 76, and may be located at other locations. The BLE modules 60 each include a transceiver having a transmitter and a receiver to transmit BLE signals and receive BLE signals which may communicate wirelessly with one or more electronic devices 62, such as a smartphone having Bluetooth or other wireless communication capability. It should further be appreciated that the BLE modules 60 may communicate with any device having Bluetooth capability and that other wireless forms of communication may be used. A person 80, such as a driver of the vehicle, may possess a BLE enabled device 62 having wireless communication Bluetooth capability which may communicate with each of the various BLE modules 60 onboard the vehicle 10. The BLE modules 60 may track the location or the distance to the wireless BLE enabled device 62 and send the BLE signals indicative thereof to the body controller 76. The body controller 76 may process each of the BLE signals and may determine a location of the BLE enabled device 62 relative to the vehicle 10, and may determine whether the person 80 is near a wheel assembly 15 based on the sensed location of the BLE enabled device 62. The location of the BLE enabled device 62 may be determined by processing the BLE signals communicating with the BLE enabled device 62 using triangulation of signals from a plurality of BLE modules 60. Accordingly, the BLE modules 60 may advantageously track the location of a person 80 possessing a BLE enabled device 62 as the person 80 moves around outside the vehicle 10 and within the vehicle 10. It should be appreciated that other BLE enabled devices other than smartphones such as BLE enabled watches or fitbands may be used to determine the location of the device and hence the person in possession of the device.

According to the proximity sensing embodiment, proximity sensors 64, such as capacitive sensors, may be located in the window glass associated with the windows and/or body panels of the vehicle 10 and may detect the location and direction of movement of a person in close proximity to the windows or body panels of the vehicle and determine if the person 80 is progressing toward and is near a wheel assembly 15. One example of a proximity sensing arrangement employing capacitive sensors in a window for detecting a person and movement of the person is disclosed in U.S. patent application Ser. No. 14/825,603, filed on Aug. 13, 2015, entitled "METHOD AND SYSTEM FOR CONTROLLING VEHICLE REAR DOOR," the entire disclosure of which is hereby incorporated by reference.

In the embodiment employing imaging cameras, one or more imaging cameras 66 may be located at various locations around the vehicle to capture images of areas proximate to the vehicle 10 and the wheel assemblies 15. Imaging cameras 66 are shown located on forward and rearward sides of the exterior mirror housing to capture images near the front and rear wheel assemblies 15. The imaging cameras 66 may be located in the bumpers, body panels, mirror housings, tail lamp assemblies, and other locations. The imaging cameras 66 may process the captured images to determine when a person is detected near a particular wheel assembly 15.

According to the ultrasonic sensor embodiment, one or more ultrasonic sensors 68 may be located on the vehicle 10 and positioned to detect a person near a wheel assembly 15. The ultrasonic sensors 68 are shown located in the front and rear body panels. The ultrasonic sensors 68 may be located in the bumpers, the body panels, mirror housings, the tail lamp assemblies and other locations. It should be appreciated that other sensors such as radar and others may be employed to detect a person near the wheel assembly 15.

Referring to FIG. 10, the vehicle wheel illumination assembly 20 is illustrated employing the controller 50 having various inputs as described above in connection with the first embodiment. In addition, the controller 50 further receives as input signals from the proximity sensors 64, the BLE modules 60, the ultrasonic sensors 68, and/or the imaging cameras 66. The BLE enabled devices 62 may also communicate with the controller 50 as well as communicating with the BLE modules 60. The controller 50 may be a dedicated controller or may be a shared controller such as the vehicle body control module (BCM). The controller 50 executes one or more routines stored in memory 54 which includes a light control routine 200. In addition, a BLE location sensing routine 150 may be stored in memory 54 and executed by microprocessor 52 to determine the location of a BLE enabled device 62 detected with the BLE signals. The BLE location sensing routine 150 may process the BLE signals and perform triangulations to determine the location of a BLE enabled device 62 (e.g., smartphone), and hence the person in possession of the device 62, according to the BLE embodiment. The controller 50 determines the location of a person near the wheel assembly based on the sensor outputs and controls the light source 20 to illuminate the wheel assembly to indicate a tire air pressure status and further controls the light source to illuminate the wheel assembly when a person is detected proximate to the wheel assembly to enable servicing of the tire. The controller 50 may control the light source to generate a first color light (e.g., red or amber) to indicate a low tire air pressure when the tire air pressure is below a pressure limit. The controller 50 may control the light source to illuminate a different second color light (e.g., white light) when a person is detected near the wheel assembly. The controller 50 may further control the light source to illuminate the wheel assembly with a different third color light (e.g., green light) to indicate sufficient tire air pressure when the tire pressure is above the pressure limit.

Figure 11A:
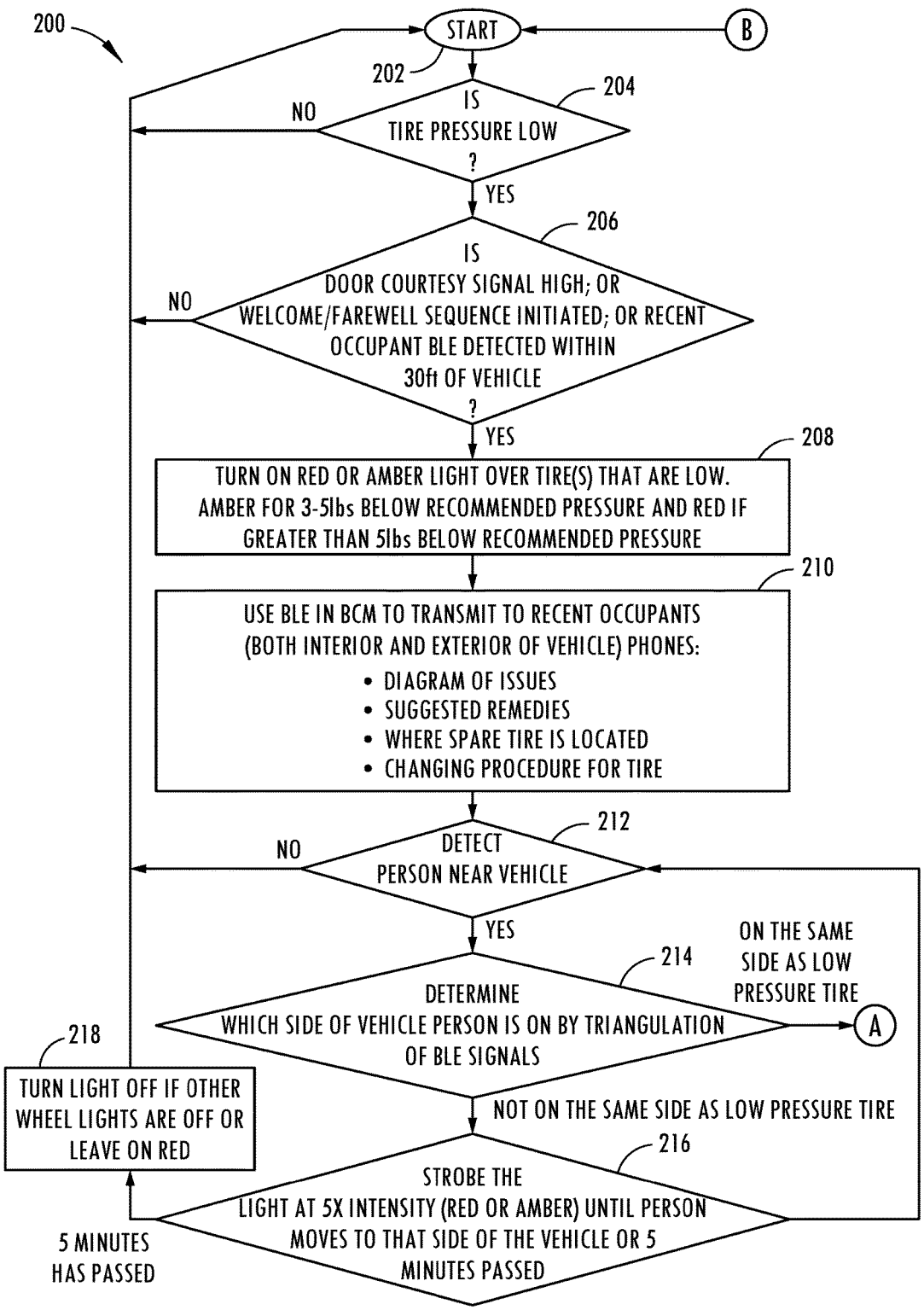
FIGS. 11A-11B is a flow diagram illustrating a routine for providing lighting control to illuminate the wheel assembly and enable servicing of the tire, according to another embodiment.
Figure 11B:
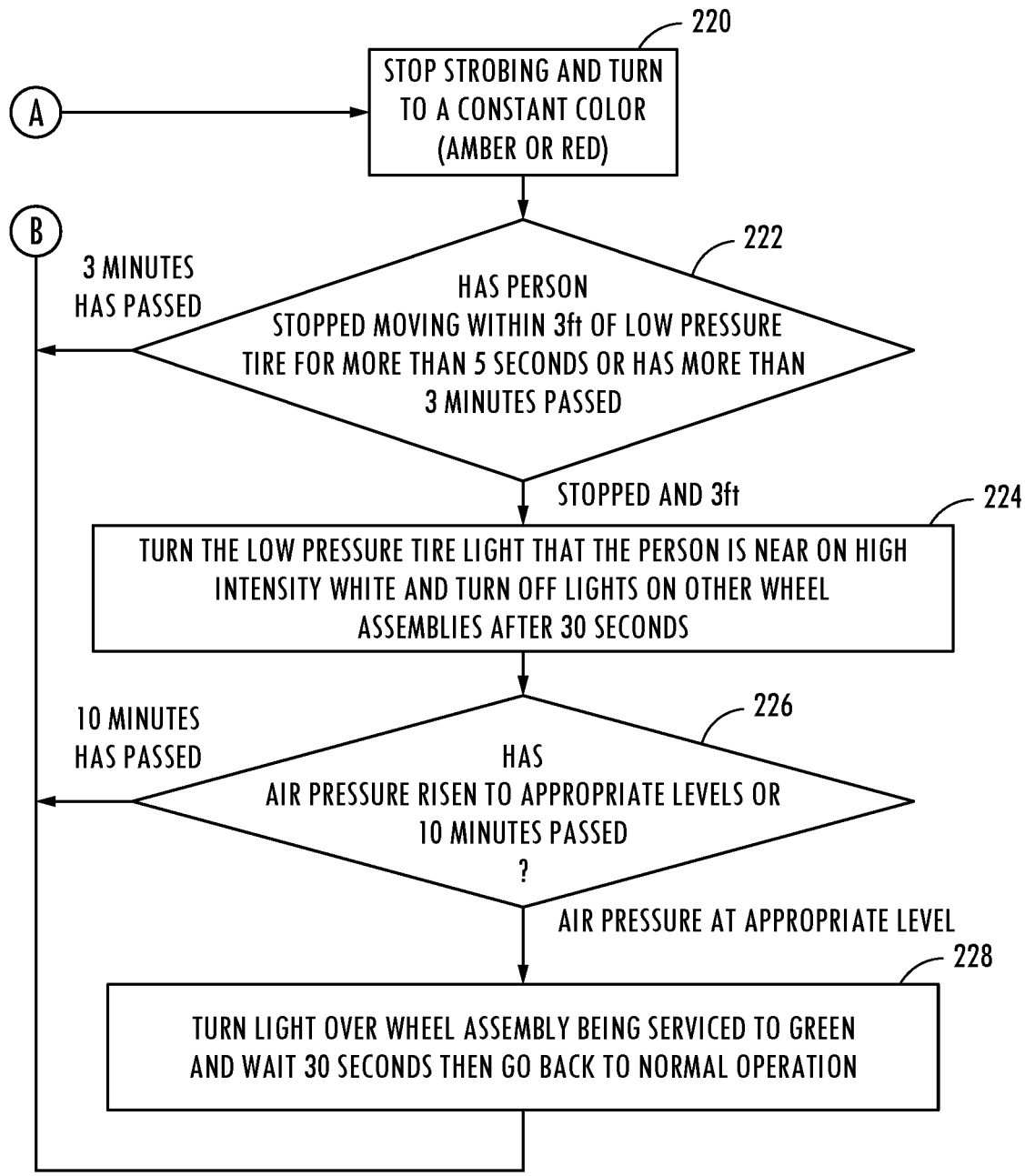

Referring to FIGS. 11A-11B, the light control routine 200 is illustrated for controlling the light source to illuminate the wheel assembly when a person is detected near the wheel assembly, according to one embodiment. Light control routine 200 begins at step 202 and proceeds to step 204 to determine if the tire air pressure is low and, if not, returns to step 202. If the tire air pressure is determined to be low, routine 200 proceeds to decision step 206 to determine if the door courtesy signal is high or if the welcome/farewell sequence is initiated or if a recent or designated occupant BLE enabled device is detected within thirty (30) feet of the vehicle, and if none of the aforementioned conditions are met routine 200 returns to step 202. If any of the conditions of decision 206 are met, routine 200 proceeds to step 208 to turn on the red or amber color light over the tire or tires that are low to illuminate the wheel assembly or assemblies, including the tire and the ground nearby. The amber color light may be generated when the tire has three (3) to five (5) pounds of tire pressure below the recommended tire air pressure, whereas the red color light may be generated if the tire air pressure is more than five (5) pounds below the recommended tire air pressure. Next, at step 210, the BLE module in the body control module (BCM) or other controller may transmit to recent occupant detected Bluetooth BLE enabled devices, e.g., smartphones, a diagram of which tire or tires are at issue, may suggest remedies such as changing the wheel assembly and hence the tire if there is a rapid loss of tire pressure or inputting air into the tire if there is a slow leak, may show where the spare tire is located and how to access it, and may provide a changing procedure for the tire. Accordingly, the user may utilize the phone or other wireless communication BLE enabled device to receive instructions for remedial action to enable servicing of the tire.

Next, routine 200 proceeds to decision step 212 to detect a person near the vehicle (e.g., car), such as within thirty (30) feet. If a person is not detected near the vehicle, routine 200 returns to step 202. If a person is detected near the vehicle, routine 200 proceeds to decision step 214 to determine which side of the vehicle the person is detected on. This may be achieved by using one or more of the sensors. When using the BLE modules, a triangulation of the BLE transmitters relative to the BLE enabled device may be performed to determine the location of the BLE enabled device and hence the person possessing the BLE enabled device. If the person is determined not to be on the same side of the vehicle as the tire needing servicing, routine 200 proceeds to decision step 216 to strobe the light of the wheel assembly facing the person and opposing the wheel assembly needing service at an increased intensity (e.g., five (5) times greater) red or amber color until the person moves to the side of the vehicle having the low tire pressure issues within a time period such as five (5) minutes as determined by decision step 216. If the person does not move to the side of the vehicle having the low tire pressure issues within five (5) minutes, routine 200 turns the light off if the other wheel lights are off or leaves the light on red color at step 218 before returning to step 202.

If the person is determined to be on the same side of the vehicle as the low pressure tire at issue, routine 200 proceeds to step 220 to stop strobing the light and to turn on a constant color light, such as an amber or red light. Next, at decision step 222, routine 200 determines if the person has stopped moving within a predetermined distance of the wheel assembly, such as three (3) feet of the low pressure tire, for more than five (5) seconds or if more than three (3) minutes has passed. If more than three (3) minutes has passed, routine 200 returns to step 202. If the person has stopped moving within three (3) feet of the low pressure tire for more than five (5) seconds, routine 200 proceeds to step 224 to turn the low pressure tire light that the person is near on high intensity white light and turn off lights on the other wheel assemblies after thirty (30) seconds. This enables the person to service the tire with a white light which may include adding increased air pressure into the tire or replacing the tire by using the while light illumination. Next, at decision step 226, routine 200 determines if the tire air pressure has risen to the appropriate level or if ten (10) minutes has passed, or if the user has left the site. If ten (10) minutes have passed, or the user left the site, routine 200 returns to step 202. If the tire air pressure has risen above the appropriate level, routine 200 proceeds to step 228 to turn the light over the wheel assembly being serviced to green and waits thirty (30) seconds and then goes back to normal operation. Accordingly, once the wheel assembly is fully serviced, the wheel illumination light illuminates a green light on the wheel assembly.

Accordingly, the vehicle wheel illumination assembly 20 advantageously provides for a light indication of the tire air pressure by illuminating the wheel assembly 15 with a first color light to indicate low tire air pressure when the tire air pressure is below a low pressure limit, and changes to a different second color light when a person is detected near the wheel assembly to enable the person to service the tire. Additionally, the assembly advantageously further illuminates the wheel assembly with a different third color light to indicate sufficient tire pressure when the tire air pressure is above the low pressure limit. As such, a user may readily identify a tire maintenance issue and may service the tire with light controlled by the vehicle wheel illumination assembly 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle wheel illumination assembly comprising:
   a light source located on a vehicle body and arranged to illuminate a wheel assembly having a tire;
   a sensor for sensing a person near the wheel assembly; and
   a controller for controlling the light source to illuminate the wheel assembly with a first light indicating tire pressure and a different second light when a person is detected near the wheel assembly to perform servicing of the tire.

2. The assembly of claim 1, wherein the controller controls the light source to change from the first light having a first color to the second light having a second color when the person is detected near the wheel assembly.

3. The assembly of claim 1, wherein the sensor comprises one or more wireless communication transceivers for detecting an electronic device in possession of the person and determining a location of the person based on signals transmitted between the one or more transceivers and the electronic device.

4. The assembly of claim 1, wherein the sensor comprises one or more proximity sensors.

5. The assembly of claim 1, wherein the sensor comprises one or more imaging cameras.

6. The assembly of claim 1, wherein the light source is located on the vehicle body near a wheel well.

7. The assembly of claim 1 further comprising a tire pressure detector for detecting a tire air pressure, wherein the light source illuminates the wheel assembly with the first light to indicate the tire pressure status indicative of the detected tire air pressure.

8. The assembly of claim 7, wherein the controller controls the light source to illuminate the wheel assembly with the first light of a first color to indicate low tire air pressure when the tire air pressure is below a pressure limit and to illuminate the wheel assembly with the different second light of a second color when the person is detected near the wheel assembly.

9. The assembly of claim 8, wherein the controller further controls the light source to illuminate the wheel assembly with a different third color light to indicate sufficient tire air pressure when the tire air pressure is above the pressure limit.

10. A vehicle wheel illumination assembly comprising:
    a light source located on a body of a vehicle;
    a tire pressure detector for detecting air inflation pressure of a tire on a wheel assembly of the vehicle;
    one or more sensors for sensing a person near the wheel assembly; and
    a controller controlling the light source to illuminate the wheel assembly with a first light indicative of a tire air pressure status and further illuminating the wheel assembly with a second light when the person is detected near the wheel assembly to perform servicing of the tire, wherein the first light indicates the tire air pressure is below a pressure limit, and wherein the light source illuminates the wheel assembly with a third light to indicate sufficient tire air pressure when the tire air pressure is above the pressure limit.

11. The assembly of claim 10, wherein the first light is a first color light, the second light is a second color light, and the third light is a third color light.

12. The assembly of claim 10, wherein the sensor comprises one or more wireless communication transceivers for detecting an electronic device in the possession of the person and determining a location of the electronic device based on signals communicated between the electronic device and the one or more wireless communication transceivers.

13. The assembly of claim 10, wherein the sensor comprises one or more proximity sensors.

14. The assembly of claim 10, wherein the sensor comprises one or more imaging cameras.

15. The assembly of claim 10, wherein the light source illuminates an outer wall of the tire of the wheel assembly to indicate the tire air pressure status.

16. The assembly of claim 10, wherein the light source is located on the vehicle body at or near a wheel well of the vehicle.

17. The assembly of claim 10, wherein the light source comprises a plurality of light emitting diodes, each generating a different color light illumination.

18. A method of illuminating a vehicle wheel assembly comprising:
    arranging a light source on a vehicle body to illuminate a wheel assembly comprising a tire;
    detecting a low tire pressure of the tire;
    activating a light source to illuminate light on the wheel assembly to indicate the low tire pressure with a first color light;
    detecting a person near the wheel assembly;
    activating the light source to illuminate light at a different second color when the person is detected near the wheel assembly to aid in servicing the tire; and
    activating the light source to illuminate light at a different third color to indicate the tire pressure is above a low pressure limit.

19. The method of claim 18, wherein the light source is located on the vehicle body at or near a wheel well.

* * * * *